No. 790,821.

Patented May 23, 1905.

UNITED STATES PATENT OFFICE.

HENRY V. DUNHAM, OF BELLOWS FALLS, VERMONT, ASSIGNOR TO CASEIN COMPANY OF AMERICA, A CORPORATION OF NEW JERSEY.

PAINT AND PROCESS OF PREPARING SAME.

SPECIFICATION forming part of Letters Patent No. 790,821, dated May 23, 1905.

Application filed July 26, 1904. Serial No. 218,198.

*To all whom it may concern:*

Be it known that I, HENRY V. DUNHAM, a citizen of the United States, residing at Bellows Falls, in the county of Windham and State of Vermont, have invented or discovered certain new and useful Improvements in Paint Compositions and Processes of Preparing Same, of which the following is a specification.

This invention or discovery relates to that class of paints now very largely in use, owing to their cheapness, which are known as "water-paints," in that they contain more or less water when mixed up for use, but which are waterproof or water-resisting, so as to withstand exposure to the weather; and the invention or discovery has for its object to improve the said class of paints by giving them a more water-resisting character, so that they will be more durable and retain their appearance better when exposed to the weather.

The present invention or discovery is an improvement on the water-paint in paste form fully set forth in the allowed application of William A. Hall, filed September 24, 1903, Serial No. 174,473. I have discovered, however, that if vaseline be mixed with the oil used with the Hall composition the waterproof qualities of the paint are greatly improved.

The improved paint composition comprises a binder or binding composition containing a solution of an animal adhesive consisting of about twenty parts of animal glue or casein, (preferably casein,) one part ammonia, one hundred and seventy parts water, two and one-half parts formaldehyde, two parts boracic acid, and one part creosote. If glue be used in place of casein, then no alkali is necessary. These stated proportions of the binder or binding composition may be varied somewhat, and the formaldehyde, boracic acid, and creosote may each or all be omitted, if desired, although it is better to use them. The formaldehyde has a waterproofing tendency and also a preservative effect, and the creosote acts as a preservative to prevent decomposition. The formaldehyde, having an acid reaction, also assists in neutralizing the alkali used with the casein and tends to produce a slightly-acid solution.

The improved paint composition also comprises a mixture of about equal parts of vaseline or petrolatum and a vegetable oil. Indian-corn oil is preferably used; but Chinese tong, linseed, cotton-seed, or other oils may be used. The vaseline is boiled or well melted with the vegetable oil prior to mixing these ingredients with the other materials of the composition.

The new paint composition is formed by mixing about one hundred parts of the binding composition or solution just above described with about two hundred parts of a powdered mineral or earthy base, as whiting or talc, (preferably talc,) forty-five parts of the above-described mixture of vaseline or petrolatum and a vegetable oil, two parts potassium oxalate, and fifty parts of water, in a portion of which latter the potassium oxalate may have been previously dissolved. The vegetable oil which I preferably employ is Indian-corn oil; but I find that good results may be secured by the use of other vegetable oils, such as linseed or cotton-seed oils.

In making the paint composition the binding composition or solution above described will first be well mixed with the talc or other mineral base employed and the mixture of vaseline and vegetable oil will then be thoroughly mixed with the talc and binding composition before adding the dissolved potassium oxalate and water.

The proportions of the vaseline or petrolatum and vegetable oil and also of the other ingredients may be varied somewhat from those above given without departing from the essence of the invention or discovery—that is to say, more or less vaseline may be mixed with the oil instead of mixing these ingredients in about equal proportions.

By employing a mixture of vaseline and oil well melted together in the improved paint composition I have found that the paste paint may be thinned down with any desired amount of water without separation of the vaseline and oil, and a perfect mixture, which will flow properly in applying the paint, will remain, and when applied the paint will absolutely shed water and be so non-porous that it will remain as waterproof or water-resisting as a full oil-paint.

Having thus described my invention or discovery, I claim and desire to secure by Letters Patent—

1. A paint composition comprising an earthy or mineral base, as talc or whiting, a mixture of vaseline and a vegetable oil, water, and a binding composition comprising an animal adhesive, as casein or glue.

2. A paint composition comprising a mineral base, a mixture of vaseline and a vegetable oil, an ammoniacal solution of casein, potassium oxalate and water.

3. A paint composition comprising a mineral base, a mixture of vaseline and a vegetable oil, an ammoniacal solution of casein, potassium oxalate, boracic acid and water.

4. A paint composition comprising a mineral base, a mixture of vaseline and a vegetable oil, an ammoniacal solution of casein, potassium oxalate, boracic acid, formaldehyde and water.

5. A paint composition comprising a mineral base, a mixture of vaseline and a vegetable oil, an ammoniacal solution of casein, potassium oxalate, boracic acid, creosote and water.

6. A paint composition comprising a mineral base, a mixture of vaseline and a vegetable oil, an ammoniacal solution of casein, potassium oxalate, boracic acid, formaldehyde, creosote and water.

7. A paint composition comprising talc, vaseline, a vegetable oil, an alkali, casein and water.

8. A paint composition comprising talc, vaseline, corn-oil, and a binding composition comprising an animal adhesive.

9. A paint composition comprising talc, vaseline, corn-oil, an alkali, casein, potassium oxalate and water.

10. A paint composition comprising a mineral base, a mixture of vaseline and a vegetable oil, an alkali, casein, formaldehyde and water.

11. A paint composition comprising a mineral base, vaseline, a vegetable oil, an alkali, formaldehyde, boracic acid and water.

12. A paint composition comprising a mineral base, vaseline, a vegetable oil, an alkali, casein, boracic acid, formaldehyde and water.

13. A paint composition comprising a mineral base, vaseline, a vegetable oil, an alkali, casein, boracic acid, formaldehyde, creosote and water.

14. A paint composition comprising a mineral base, vaseline, a vegetable oil, an alkali, casein, boracic acid, formaldehyde, creosote, potassium oxalate and water.

15. The herein-described process of preparing a paste paint, consisting in thoroughly combining vaseline with a vegetable oil by subjecting a mixture of the vaseline and oil to the action of heat until the vaseline is thoroughly melted and mixed with the oil, and then subsequently compounding the mixture of vaseline and oil with a powdered mineral base and a binding composition comprising an animal adhesive.

In testimony whereof I affix my signature in presence of two witnesses.

HENRY V. DUNHAM.

Witnesses:
 LOUIS H. SMITH,
 A. F. GRIGNON.